June 4, 1963  E. A. WALSH  3,092,362

TANDEM SEAT ARRANGEMENT FOR BICYCLES

Filed May 1, 1961

INVENTOR.
Edward A. Walsh
BY
Wayland D. Keith
HIS AGENT.

United States Patent Office 3,092,362
Patented June 4, 1963

3,092,362
TANDEM SEAT ARRANGEMENT FOR BICYCLES
Edward A. Walsh, Wichita Falls, Tex.
(1334 Stratford, Parker, Fla.)
Filed May 1, 1961, Ser. No. 106,608
3 Claims. (Cl. 248—291)

This invention relates to improvements in bicycles and more particularly to the conversion of a one-passenger bicycle into a two-passenger bicycle so that the passengers can ride in tandem relation, and either or both may participate in the pumping or pedaling of the bicycle.

Various tandem bicycles have been proposed heretofore, but these usually required an elongated frame with at least two independent sets of pedals which usually required two sets of sprockets and two sets of chains to complete the complement of the bicycle drive to the driven wheel.

The present invention is so designed that a conventional one-passenger bicycle can be converted into a two-passenger bicycle so that each rider may pedal individually or both riders may pedal in unison. Furthermore, the bicycle can be ridden by a single rider without having to remove any of the conversion accessories, once the conversion is made.

An object of this invention is to provide a device for converting a one-passenger bicycle into a two-passenger bicycle so that each passenger may pedal the bicycle independently or, the two passengers may pedal in unison.

Another object of the invention is to provide a tandem seat arrangement for a bicycle, whereby a single seat bicycle may be converted to a two-seat bicycle, and wherein the seats are independently adjustable.

Another object of the invention is to provide a pedal arrangement for a bicycle whereby the conventional pedals may be extended laterally so that the second rider may pedal the bicycle without the necessity of installing a separate gearing mechanism.

Still a further object of the invention is to provide a conversion kit for a bicycle, which will enable the conversion of a single passenger bicycle into a two-passenger bicycle, which is inexpensive to construct, easy to install, efficient in operation, and low in cost of manufacture.

With these object in mind and others which will become manifest as the description proceeds, reference is to be had to the accompanying drawing in which like reference characters designate like parts in the several views thereof, in which.

Figure 1:
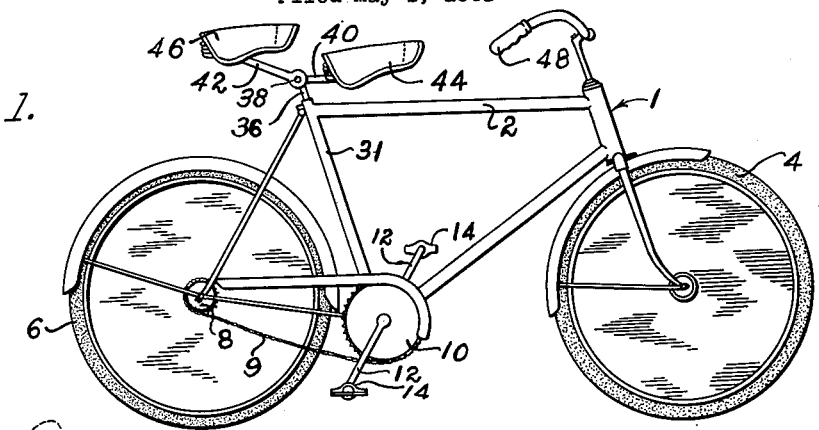
FIG. 1 is an elevational view of a conventional bicycle with the conversion accessories shown thereon to convert a single seat bicycle to a two seat arrangement, and showing pedal extensions thereon.
Figure 2:
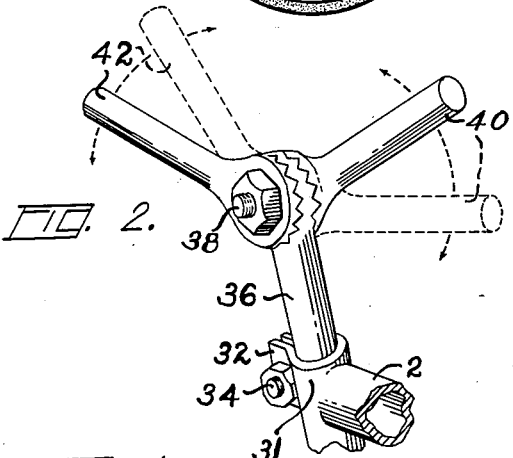
FIG. 2 is a perspective view of the adjustable seat support mechanism, with the seats removed therefrom, and showing the device fitted in a fragmentary portion of the frame of a bicycle, with the full outline view representing one position of adjustment of the seat supports and the dashed outline representing an alternate adjusted position of the seat supports.
Figure 3:
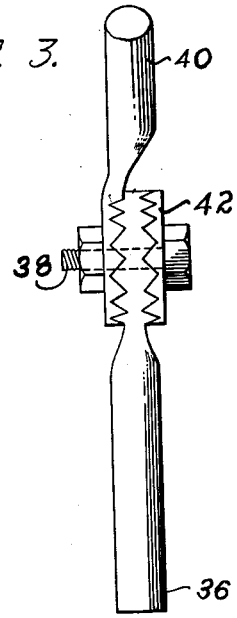
FIG. 3 is an elevational view of the seat support mechanism shown apart from the bicycle frame, with one of the seat supports extending in one direction and the other seat support extending in an opposite direction and not being visible.
Figure 4:
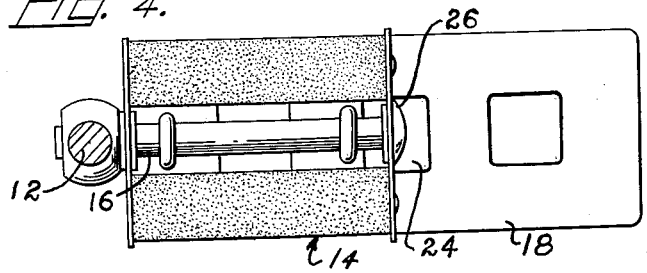
FIG. 4 is a sectional view taken on line 4—4 of FIG. 5, looking in the direction indicated by the arrows, and showing an auxiliary pedal extension on a conventional pedal.
Figure 5:
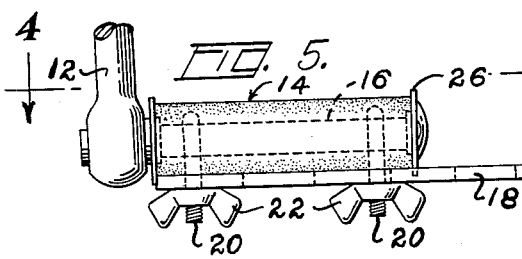
FIG. 5 is a fragmentary side elevational view of the lower portion of a bicycle crank showing the conventional pedal thereon, and showing the auxiliary pedal extension attached thereto.
Figure 6:
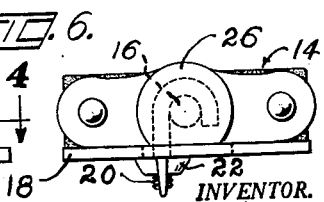
FIG. 6 is an end view of the bicycle pedal showing the auxiliary pedal extension installed thereon.

With more detailed reference to the drawing the numeral 1 designates generally a conventional bicycle having a frame 2, a steerable wheel 4 and a driven wheel 6. The wheels of the present bicycle are shown to be pneumatically tired disc wheels, with the driven wheel 6 having a sprocket 8 thereon, which sprocket is connected in driving relation with the wheel. A sprocket 10 is journaled in frame 2. A chain 9 surrounds sprockets 8 and 10 to connect the sprockets in geared relation. The sprocket 10 has oppositely extending crank arms 12 thereon for propelling the bicycle over the terrain. Each of the crank arms 12 has a conventional pedal 14 on the distal end thereof, each of which pedals has an axial shaft 16 extending mediate the pedal 14 for journaling the pedal 14 for movement about the axis of the shaft 16. An auxiliary pedal extension plate 18, which is of greater length than the length of pedals 14, is secured to the lower face of pedal 14 by J-bolts 20, which J-bolts are preferably secured in place by the respective wing nuts 22 which pass through holes in the respective plates 18 so that each plate 18 may be secured in binding relation with the lower side of a pedal 14 by the threaded engagement of the respective wing nuts 22 with the lower side of the respective auxiliary pedal extension plates 18.

By having each auxiliary pedal extension plate 18 extending outward a spaced distance beyond the outer ends of pedals 14, a second rider may rest his feet on the pedal extensions and either pedal in unison with the first rider, or either rider may operate the pedals with the other rider exerting a minimum of effort.

The plates 18 each have holes 24 formed therein and particularly at a point which will register with the terminal end of axial shaft 16, as usually each of the shafts has an enlargement, such as a cap or nut 26, thereon so that the respective plates 18 may fit closely against the underside of the respective pedals 14, with the plate or nut 26 extending into the hole 24.

Tandem Seat Arrangement

The upstanding member 31 of frame 2 is tubular and has a clamp 32 thereon near the upper end thereof. A bolt 34 passes through holes formed in the clamp 32 so a seat post 36 may be secured to frame member 31 in binding relation therewith, so the seat post may be positioned at the desired elevation with respect to the frame 2.

In order to convert a conventional bicycle into a two-passenger, tandem bicycle, as shown herein, the conventional seat post is removed and the seat post 36 fitted within upstanding tubular member 31 and the clamp 32 brought into binding engagement with the seat post 36 by screw-threaded bolt 34. Upright post 36 is radially serrated on opposed sides and is transversely apertured to receive a bolt 38 therethrough. Seat support bars 40 and 42 each have one end radially serrated for complemental engagement with the radial serrations of seat post 36. An aperture is formed transversely through the respective support bars 40 and 42, so when the bolt 38 is passed through the apertures in seat support bars 40 and 42 and through the aperture in support post 36, the seat support bars may be adjusted at different elevations and at different angles to accommodate seats 44 and 46, which seats may be of conventional size and shape, with the conventional adjustments thereon to give the desired seat angle with respect to the frame 2.

A pedal extension plate 18 is secured on each of the pedals 14 by J-bolts 20 so to thereby secure a pedal extension plate 18 to the lower side of the respective pedals 14. The pedal extension plates 18 will extend laterally outward from the ends of the respective pedals a sufficient distance to receive at least a portion of a foot or assist in the pedaling of the bicycle.

Dependent upon the respective length of the arms of the riders, the rider on the forward or the rearward seat may steer the bicycle by the manipulation of handle bars 48 in the conventional manner.

Operation

The operation of the bicycle, by one person, is the same as if the tandem seat arrangement were not fitted thereon; however when the second passenger uses the bicycle in complemental arrangement to the first passenger, the second passenger places the feet on the auxiliary pedal extension plates 18, and pedals in unison with the passenger on the front seat 44. However, the passenger on the front seat may lift the feet from the pedals 14 and steer the bicycle by the use of handle bars 48, and the second passenger may continue to pedal the bicycle by actuation of the cranks 12 by auxiliary extension plates 18, or the second passenger may lift the feet from the pedal extension plates 18 and the passenger on seat 44 may pedal the bicycle in the conventional manner, or either passenger may exert power to pedals 14 or auxiliary pedal extensions 18, with the feet of the other passenger resting on the pedals without material effort being exerted.

A bicycle constructed in accordance with the present arrangement, or a standard bicycle converted to the tandem seat arrangement with pedals arranged for dual use, enables double utilization of a single bicycle by two individuals. Furthermore, it enhances the riding pleasure for two passengers to ride a single vehicle rather than each passenger occupying a bicycle. The use of the present arrangement enables long distances to be traversed easily by a pair of riders who may "take turns" in effective actuation of the cranks which operate the sprocket and chain drive to the driven wheel 6 to propel the vehicle over the terrain.

Having thus clearly shown and described the invention, what is claimed as new and desired to be secured by Letters Patent is:

1. A conversion kit for converting a single passenger bicycle, having a frame, into a two passenger bicycle for riding in tandem relation, a seat post socket positioned in the frame of said bicycle; said kit comprising a seat post adapted to seat in said seat post socket, said post being transversely apertured on one end thereof, said apertured end of said seat post having serrated faces on the opposite sides thereof with said aperture being located centrally of said serrated faces, a pair of apertured seat support bars, said seat support bars each having a serrated face on the apertured end thereof so the respective apertures will be located centrally of said serrated face, said serrations of said seat support bars being complemental with said serrations formed on said seat post, said apertures in said seat support bars being registerable with said aperture in said seat support post, and screw-threaded means positioned within said apertures to hold said seat support bars in binding engagement with said serrated face of said seat post.

2. A conversion kit for converting a single passenger bicycle, having a frame, into a two passenger bicycle for riding in tandem relation, a seat post socket positioned in the frame of said bicycle on the upper side thereof, said conversion kit comprising; an elongated seat post adapted to fit in said seat post socket, said seat post having a flattened, transversely apertured head on the upper end thereof, said flattened, apertured head of said elongated seat post having faces on the opposite sides thereof, a pair of seat support bars, each having one end thereof flattened, each said flattened portion of each said seat support bar having an aperture formed transversely therethrough, said flattened portions of said seat support bars having the faces thereof complementary to the adjacent faces on said elongated seat post, said apertures in said seat support bars being registerable with said aperture in said elongated seat post, pivot means passing through said aperture in each said seat support bar and through the aperture in said elongated seat post to enable independent arcuate adjustment of each said seat support bar with respect to said elongated seat support post, means associated with said pivot means to bindingly engage said seat support bars in adjusted, fixed relation with respect to said elongated seat post.

3. A conversion kit for converting a single passenger bicycle, having a frame, into a two passenger bicycle for riding in tandem relation, a seat post socket positioned in the frame of said bicycle; said conversion kit comprising a seat post adapted to complementally seat in said seat post socket, said seat post being transversely apertured on one end thereof, said apertured end of said seat post having faces on opposite sides thereof, with the aperture being located centrally of said faces, a pair of apertured seat support bars, said seat support bars each having a face on the apertured end thereof which is complementary to the respective faces on said seat post so the respective apertures in said seat support bars will be located centrally of said respective faces, said apertures in said seat support bars being registerable with said aperture in said seat post, and a screw threaded bolt fitted within said apertures to hold said seat support bars in independent, binding engagement with the faces on said apertured end of said seat post.

References Cited in the file of this patent

UNITED STATES PATENTS

| | | |
|---|---|---|
| 585,858 | Wooster | July 6, 1897 |
| 603,735 | Porter | May 10, 1898 |
| 604,919 | Metz et al. | May 31, 1898 |
| 1,216,029 | Whitaker | Feb. 13, 1917 |
| 2,337,246 | Kelly | Dec. 21, 1943 |
| 2,361,708 | Raba et al. | Oct. 31, 1944 |
| 2,476,226 | Schwinn | July 12, 1949 |
| 2,516,352 | Stewart | July 25, 1950 |
| 2,715,342 | Ridgway | Aug. 16, 1955 |